United States Patent Office 3,230,103
Patented Jan. 18, 1966

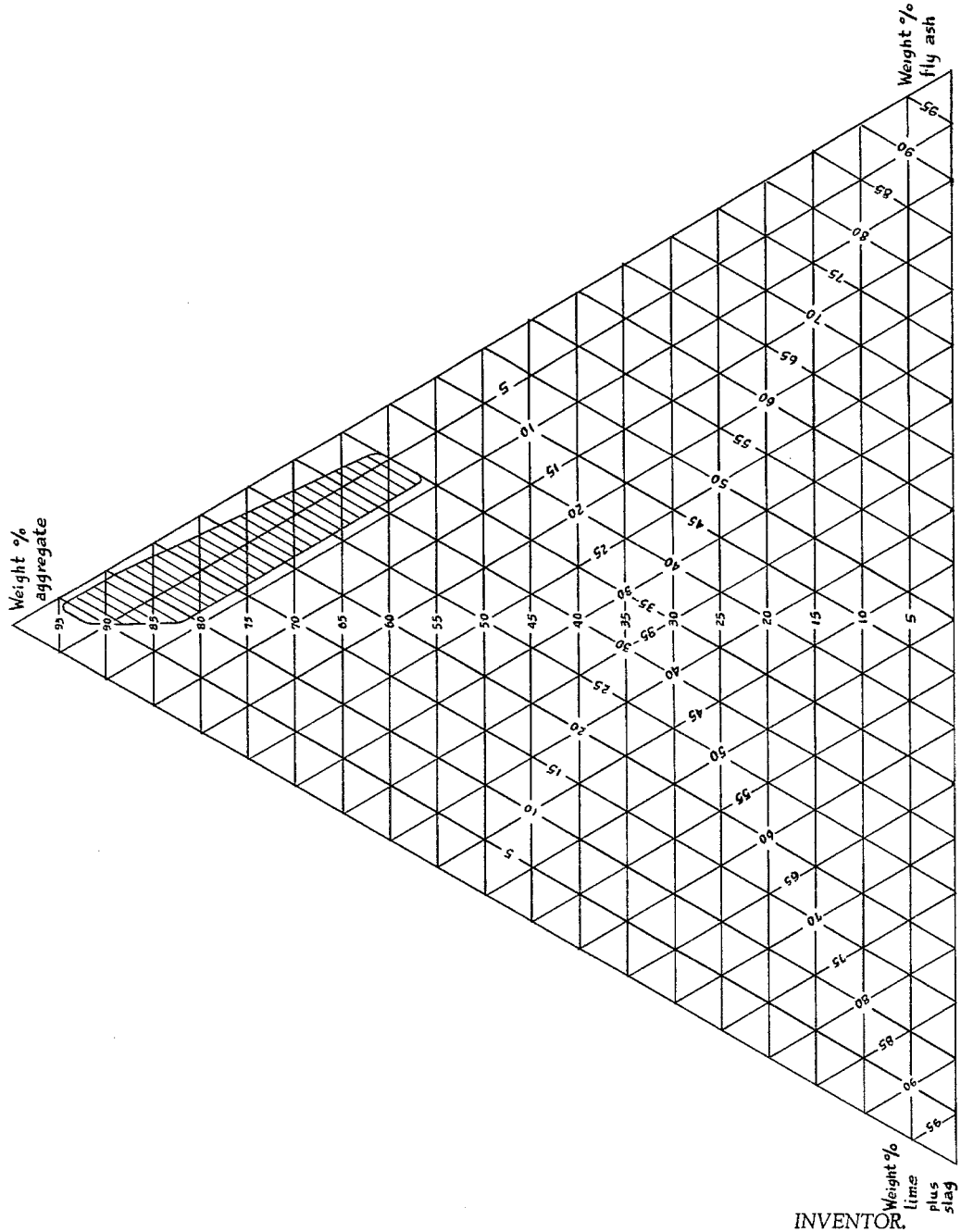

3,230,103
NON-PLASTIC COMPOSITION CONTAINING POZ-
ZOLAN, LIME AND BLAST FURNACE SLAG
Leonard John Minnick, Cheltenham, Pa., assignor to
G. & W. H. Corson, Inc., Plymouth Meeting, Pa., a
corporation of Delaware
Filed May 16, 1963, Ser. No. 280,893
6 Claims. (Cl. 106—117)

This invention relates to a pozzolanic material and more specifically concerns a composition having structural and load supporting properties, for use as road bases and base layers for other uses such as parking lots, airport runways and the like.

It is known in the art to combine a pozzolan such as fly ash with lime and other ingredients in order to provide a composition which when mixed with water has a tendency to set up rather slowly, ultimately building in strength to form a mass of rock-like hardness. Typical compositions containing lime and fly ash are those disclosed in the patents to Havelin and Kahn Nos. 2,564,690, 2,698,252, 2,815,294 and 2,937,581. These patents disclose the ideas of combining lime and fly ash with various materials such as sand, soil, various aggregates and the like, in order to produce a composition which slowly sets up to form a hard rock-like mass.

Some of the compositions of the prior art have been found to set up very slowly and even to form engineering properties in the nature of load supporting characteristics only after the passage of several weeks. Others of such compositions have been found to have somewhat higher early bearing strength, thus allowing the use of roads and other load supporting surfaces shortly after the surfaces are created. In all such cases however the actual compressive strength of the composition has been seriously limited and no way has been found to provide for a sharp increase of early compressive strength.

Lime has been one of the relatively expensive ingredients of the composition. Its expense is several times that of fly ash in most industrial localities, since fly ash is recovered as a stack dust in many public utility power plants. Also, most limes including high calcium lime and dolomitic lime are considerably more expensive than the aggregates with which they are mixed, particularly including such finely divided aggregates as soil and the like. Efforts have been made to reduce the costs of the combined materials without degrading the engineering characteristics of the product.

Accordingly, it is an object of this invention to provide a load supporting composition which has excellent engineering properties but requires a much smaller percentage of lime, thus reducing the overall cost of the material. Another object of this invention is to provide a load supporting material which, notwithstanding its economy, has sharply improved early compressive strenght characteristics.

Other objects and advantages of this invention, including the ease with which it may be incorporated into existing road building and other construction operations, will further become apparent hereinafter.

It has now been discovered that the foregoing objects are attained by providing a mixture, in critically important percentages, of lime, a pozzolan such as fly ash for example, and finely divided blast furnace slag. It has been found that compositions in accordance with this invention are readily mixed to form a substantially uniform product which has exceedingly high early compressive strength and which can be uitlized in many ways, because of that advantage, in which the compositions of the prior art could not be used.

Referring to the drawing, the shaded area of which sets forth the area encompassed by this invention, it will be seen that the proportions in accordance with this invention are critical. The drawing is a triangular chart showing the applicable percentages by weight of (a) lime plus slag, (b) fly ash and (c) aggregate.

It is important that the compositions be mixed in accordance with the following percentages by weight:

| Ingredient: | Percent by weight |
|---|---|
| Lime | 2–40 |
| Finely divided blast furnace slag | 2–40 |
| Fly ash | 50–90 | where the percentage of slag is in the range from ¼ to four times the percentage of lime. This combination is to be combined with inert aggregate to produce 1–9% by weight lime plus slag (20–80% being slag), 4–35% by weight fly ash, and 56–95% by weight inert aggregate, wherein the ratio of percentage lime plus slag to percentage fly ash falls substantially within the range of from 1:1 to 1:9.

As used throughout this specification and claims, the term "lime" is used to indicate quicklime, hydrated lime, and slaked lime. The term "hydrated lime" indicates a dry powder obtained by treating quicklime with water enough to satisfy its chemical affinity for water under the conditions of its hydration. Hydrated lime consists essentially of calcium hydrate or a mixture of calcium hydrate and/or magnesium oxide and/or magnesium hydroxide. In the above definition quicklime is used to indicate a a calcined material the major portion of which is calcium oxide (or calcium oxide in natural association with a lesser amount of magnesium oxide) capable of slaking with water. The term "slaked lime" is used interchangeably with "hydrated lime." Both hydrated lime and slaked lime may be associated with excess water, resulting in a moist or slurried state or condition.

The term "pozzolan" as used herein is intended to apply to the group of silicious or silicious and aluminous materials, which in themselves possess little or no cementitious value, but will, in finely divided form and in the presence of moisture, chemically react with lime at ordinary temperatures to form compounds possessing cementitious properties. Among the outstanding pozzolans is fly ash, which is an artificial pozzolan recovered from the stack gases of electric power plants and the like. The term "fly ash" as used in the present specification is intended to indicate the finely divided ash residue produced by the combustion of ground or powdered pulverized coal, which ash is carried off with the gases exhausted from the furnace in which the coal is burned and which is collected from these gases usually by means of suitable precipitation apparatus such as electrical precipitators. The fly ash so obtained is in a finely divided state such that at least about 70% passes through a 200 mesh sieve.

As used herein, the term "finely divided blast furnace slag" indicates the non-metallic product consisting essentially of silicates and aluminosilicates of calcium, which product is developed simultaneously with iron in a blast furnace and is floated off the top of the iron, and is normally produced by rapidly chilling or quenching the molten material in water, steam or air, thus producing a coarse, granular product.

In blast furnace slag which is ideally suited for use in accordance with this invention, the material is converted by grinding or pulverizing to extremely fine particles, at least about 70% by weight of which passes through a standard 325 mesh screen, and in addition the surface area as measured by air permeability shall be equal to at least about 2000 square centimeters per gram, using the method disclosed in ASTM Designation C 204.

Chemically, blast furnace slag in accordance with this invention, contains as principal ingredients in approximately the proportions by weight stated below:

| Ingredient: | Percent by weight |
|---|---|
| $SiO_2$ | 30–45 |
| $Fe_2O_3$ | 0–6 |
| $Al_2O_3$ | 5–18 |
| $CaO$ | 35–50 |
| $MgO$ | 3–18 |
| $S$ | 0–3 |

Blast furnace slag has a composition which somewhat resembles glass but is considerably richer in calcium compounds than pozzolans such as fly ash and the like. It is believed that, in combination with the lime and pozzolan, the calcium compounds of the slag hydrate during the course of the pozzolanic reaction and about 60–65% by weight of the slag, based on a calcium hydroxide equivalent, may be involved in the hydration reaction, such having heretofore been combined chemically as calcium silicates and aluminosilicates, but being rendered available indirectly in the course of the pozzolanic reaction. Thus, there is an interaction of the three ingredients of the composition, producing a product which has unprecedentedly high early compressive strength.

The properties of ingredients in accordance with this invention are critical. In actual practice the optimum proportions have been found to be 10–50% by weight lime plus slag and 50–90% by weight fly ash. In accordance with this invention, from about 20% to about 80% by weight of the lime must be replaced by finely divided blast furnace slag. Accordingly, the porportions of ingredients in accordance with this invention are as follows:

| Ingredient: | Percent by weight |
|---|---|
| Lime | 2–40 |
| Finely divided blast furnace slag | 2–40 |
| Fly ash | 50–90 | where the percentage of slag is in the range from ¼ to four times the percentage of lime.

The foregoing mix is, in practice, combined with inert aggregate in specific proportions, namely, 5%–44% by weight of the mix with the balance (95%–56% by weight) of the aggregate. In the final product, the weight proportions are as follows:

| Ingredient: | Percent by weight |
|---|---|
| Lime plus slag | 1–9 |
| Fly ash | 4–35 |
| Aggregate | 56–95 |

Within the ranges specified above, unexpected and highly advantageous results are obtained, as is indicated by the following examples.

Example 1

A mixture was prepared consisting of 3.5% by weight of dolomitic monohydrated lime, 85% of which passed through a 325 mesh screen, 10% by weight of fly ash and 90% by weight of crushed limestone. The percentage of lime has been based upon the total of fly ash plus aggregate.

This mixture was subjected to a structural strength test. According to this test, cylinders (4″ diameter x 4.6″ length) of the final mix are molded and placed in a box containing concrete sand. The cylinders are first placed on a one inch layer of sand. Sand is then placed around the cylinders so that a minimum of one inch of sand is between cylinders and between the sides of the box and the cylinders. The cylinders are covered with a one inch layer of sand and the surface of the sand is made smooth. Each day the sand is sprinkled uniformly with water at a rate of ⅜ gallon per square yard. The cylinders remain in the sand for various curing periods, for example, 7, 14 and 28 days or longer. After curing the cylinders are removed from the sand, saturated with water for 24 hours and tested for unconfined compressive strength.

After 14 days, three cylinders were tested for compressive strength and were found to have an average compressive strength of 690 pounds per square inch. After 21 days of the same treatment, another three cylinders showed an average compressive strength of 950 pounds per square inch while after 28 days a similarly tested group showed an average compressive strength of 1130 pounds per square inch.

By way of comparison, another sample was prepared and tested identically, except that that sample consisted of (instead of 3.5% by weight of dolomitic monohydrated lime) 20% of that amount (0.7% by weight) of dolomitic lime and 80% of that amount (2.8% by weight) of finely divided blast furnace slag which had been water-quenched, approximately 80% of which passed through a standard 325 mesh screen (air permeability surface area 2740 sq. cm./gram). After subjecting to the standard structural strength test for 14 days, the product had an average compressive strength of 1820 pounds per square inch. Thus it will be apparent that the compressive strength of the composition containing 20% of lime and 80% of slag was grossly in excess of the compressive strength of the composition containing pure lime. In point of fact, after 14 days the compressive strength of 1820 as against 690, for the material containing no slag, illustrates a drastically increased early compressive strength.

Example 2

A composition was tested in a manner similar to that of Example 1, except that it consisted essentially of 1.4% by weight of dolomitic monohydrated lime and 2.1% by weight of slag mixed with 10% weight of fly ash and 90% of the same aggregate. This composition, after undergoing the standard structural strength test, had the following strength characteristics:

| Number of days | Compressive strength- average-pounds per square inch |
|---|---|
| 14 | 1170 |

Example 3

Mixtures were prepared utilizing 90% by weight of the same aggregate, 10% by weight of fly ash, and 5% by weight of the lime-slag blend listed in the following table. In each case, the lime and slag showed a screen analysis of at least 80% by weight passing through a standard 325 mesh screen. Using the standard structural strength test heretofore described, the compressive strength results were:

TABLE 1

| Lime-slag blend | | Age tested, days | Comp. strength (average), p.s.i. |
|---|---|---|---|
| Wt. percent lime | Wt. percent slag | | |
| 100 | --- | 14 | 515 |
|  |  | 21 | 730 |
| 20 | 80 | 14 | 1,495 |
|  |  | 21 | 1,490 |
| 40 | 60 | 14 | 1,335 |

Example 4

Seven day compressive strength tests were run, utilizing various percentages of Maryland gravel and fly ash, 5% by weight of dolomitic monohydrated lime or slag or mixtures thereof, all as reported in the following table. In each case, both the lime and the slag showed a screen test of at least 85% through a standard 325 mesh screen. Utilizing standard structural strength tests, the compressive strength results (7 days cure) were as follows, all percentages being given by weight:

TABLE 2

| Lime-slag blend | | Wt. percent of fly ash (Eddystone raw) | Wt. percent of aggregate (Maryland gravel) | Comp. strength (average), p.s.i. |
|---|---|---|---|---|
| Wt. percent lime | Wt. percent slag | | | |
| 100 | ----- | 10 | 90 | 133 |
| 40 | 60 | 10 | 90 | 168 |
| 100 | ----- | 12.5 | 87.5 | 117 |
| 40 | 60 | 12.5 | 87.5 | 390 |
| 20 | 80 | 12.5 | 87.5 | 300 |
| 100 | ----- | 15 | 85 | 56 |
| 40 | 60 | 15 | 85 | 240 |
| 20 | 80 | 15 | 85 | 78 |

Example 5

Utilizing Ohio gravel (90% by weight) and Eddy-stone fly ash (10% by weight), and using lime or slag (5% by weight of combined ingredients) each showing at least 85% passing through a 325 mesh screen, the following beam box results were obtained:

TABLE 3

| Lime-slag blend | | Age tested, days | Comp. strength (average), p.s.i. |
|---|---|---|---|
| Wt. percent lime | Wt. percent slag | | |
| 20 | 80 | 7 | 600 |
| | | 14 | 760 |
| | | 28 | 1,030 |
| 40 | 60 | 7 | 570 |
| | | 14 | 698 |
| | | 28 | 880 |

Example 6

The following table shows (in weight percentages) compositions containing no aggregate but containing combined lime and water-quenched blast furnace slag with pozzolan, such compositions having the ability to set up to form hard masses having load supporting properties:

| Wt. percent lime (Type N) | Wt. percent slag | Wt. percent fly ash | Curing time (days) | Comp. strength (average), p.s.i. |
|---|---|---|---|---|
| 33.3 | 0 | 66.7 | 7 | 398 |
| 13.3 | 20 | 66.7 | 7 | 940 |
| 33.3 | 0 | 66.7 | 14 | 645 |
| 13.3 | 20 | 66.7 | 14 | 1,060 |
| 33.3 | 0 | 66.7 | 28 | 880 |
| 13.3 | 20 | 66.7 | 28 | 1,505 |

Example 7

The following table shows, in percentage by weight, compositions containing a gravel aggregate in combination with lime, water-quenched blast furnace slag and fly ash:

| Percent lime (Type N) | Percent slag | Percent fly ash | Gravel, percent agg. | Curing time (days) | Comp. strength (average), p.s.i. |
|---|---|---|---|---|---|
| 5 | 0 | 10 | 90 | 7 | 70 |
| 2 | 3 | 10 | 90 | 7 | 145 |
| 5 | 0 | 10 | 90 | 14 | 150 |
| 2 | 3 | 10 | 90 | 14 | 230 |
| 5 | 0 | 10 | 90 | 28 | 375 |
| 2 | 3 | 10 | 90 | 28 | 334 |

The gravel had the following sieve analysis:

| Sieve size: | Percent passing |
|---|---|
| ¾″ | 100 |
| ⅜″ | 84 |
| #4 | 78 |
| #10 | 73 |
| #40 | 30 |
| #60 | 14 |
| #200 | 11 |
| Plasticity Index | NP |
| Classification | A-1-b |

NOTE: This is a sieve analysis on the minus ¾″ material, since the plus ¾″ material was discarded for the test.

Example 8

The following examples are similar to those in Example 7 but were run with Bureau of Public Roads Classification A-1-b crushed stone as the aggregate, percentages being by weight:

| Percent lime (Type N) | Percent slag | Percent fly ash | Percent agg. BPR A-1-b crushed stone | Curing time (days) | Comp. strength (average), p.s.i. |
|---|---|---|---|---|---|
| 3.5 | 0 | 10 | 90 | 6 | 423 |
| 1.4 | 2.1 | 10 | 90 | 6 | 823 |
| 3.5 | 0 | 10 | 90 | 13 | 710 |
| 1.4 | 2.1 | 10 | 90 | 13 | 865 |
| 3.5 | 0 | 10 | 90 | 27 | 1,165 |
| 1.4 | 2.1 | 10 | 90 | 27 | 1,225 |
| 5 | 0 | 10 | 90 | 7 | 596 |
| 2 | 3 | 10 | 90 | 7 | 886 |
| 5 | 0 | 10 | 90 | 14 | 1,120 |
| 2 | 3 | 10 | 90 | 14 | 1,650 |
| 5 | 0 | 10 | 90 | 28 | 1,210 |
| 2 | 3 | 10 | 90 | 28 | 1,770 |

The crushed stone had the following screen analysis:

| Sieve size: | Percent Passing |
|---|---|
| ⅜″ | 100 |
| #4 | 96 |
| #10 | 72 |
| #40 | 38 |
| #60 | 34 |
| #200 | 10 |
| Plasticity Index | NP |
| Classification BPR | A-1-b |

The lime, slag and fly ash used in the foregoing tests had the following chemical analyses:

| | Lime (Type N) | Slag | Fly ash |
|---|---|---|---|
| $SiO_2$ | 1.00 | 33.52 | 42.60 |
| $Fe_2O_3$ | 0.58 | 3.29 | 16.59 |
| $Al_2O_3$ | 0.54 | 11.06 | 23.75 |
| CaO | 46.75 | 43.92 | 6.45 |
| MgO | 33.80 | 7.19 | 1.05 |
| $SO_3$ | --------- | 1.35 | 1.94 |
| Loss on ignition | 16.80 | 0.24 | 6.01 |
| Specific gravity | 2.61 | 3.01 | 2.44 |
| Sieve size, percent passing: | | | |
| #60 | 97.1 | --------- | --------- |
| #100 | 95.0 | --------- | 98.65 |
| #200 | 90.6 | --------- | 88.74 |
| #325 | --------- | 88.21 | 80.44 |

Example 9

Further compositions useful in accordance with this invention, percentages being by weight, are as follows:

PERCENT BY WEIGHT

| Lime | Water-quenched blast furnace slag | Fly ash | Aggregate |
|------|-----------------------------------|---------|-----------|
| 0.4  | 1.6  | 8  | 90 |
| 4    | 5    | 21 | 70 |
| 1.6  | 0.4  | 18 | 80 |
| 1.8  | 7.2  | 16 | 75 |
| 7.2  | 1.8  | 11 | 80 |
| 1.6  | 0.4  | 15 | 83 |
| 1    | 2    | 7  | 90 |
| 2    | 3    | 15 | 80 |
| 3    | 2    | 20 | 75 |
| 2    | 5    | 18 | 75 |
| 6    | 3    | 11 | 80 |
| 5    | 4    | 26 | 65 |

All of the tests referred to in the foregoing examples were unconfined compressive strength tests, using conventional testing equipment such as that used for mortars, concrete and the like. These results demonstrate the improvement in structural properties and bearing capacity which is developed by the use of this invention as contrasted with the relatively low early strengths of compositions of the prior art.

Compositions in accordance with this invention may be prepared in any conventional manner, such as by simple mixing of the solid components, preferably in the presence of water. However the mixing is preferably carried into effect by mixing the lime and finely divided blast furnace slag (either with or without the pozzolan) in predetermined proportions and then mixing that mixture with the other ingredient or ingredients of the composition.

From the foregoing description and examples it will be appreciated that compositions in accordance with this invention are applicable to a wide variety of uses.

Among such uses are road base, sub-base and sub-grade compositions, earthwork structures such as dams, reservoirs and the like, beach sand stabilization for prevention of beach erosion, etc. Also, these compositions are useful grouting compositions and structural building units, and are useful in conjunction with Portland cement in the field of mortars and concretes. They are excellent protective coating and lining compositions to impart structural strength together with good refractory, waterproofing and acid resistance properties.

These compositions have great advantage by reason of their relatively low cost and high early compressive strength characteristics. Due to the immediate changes in properties, which changes are created by a coaction between the lime, fly ash and blast furnace slag, the compacted mixture has a surprsingly great compressive strength even before complete setting and even as early as 7 days after compaction. This characteristic is highly valuable in the construction industry.

It will be appreciated that additional materials may be incorporated into compositions according to this invention, such as Portland cement, special grades of clay soils and aluminosilicates and the like, without detrimental effect. However, it will be appreciated that the substance of the invention does not depend upon the addition of any such other ingredient, inasmuch as the coaction involving the three ingredients of this invention produces the excellent strength characteristics that are described herein. Even coarse particles of blast furnace slag may be incorporated as the aggregate but these are relatively inert and are to be distinguished sharply from the finely divided slag particles (at least about 70% by weight through 325 mesh) which are essential ingredients according to this invention.

The foregoing description and examples are presented as illustrations of preferred embodiments of the invention. All modifications and variations which conform to the spirit of the invention, including the substitution of equivalents and other changes in the particular form thereof, as well as the use of certain features without the use of others, are intended to be included within the scope of this invention as defined in the appended claims.

Having thus described the invention, it is claimed:

1. A non-plastic composition of matter consisting essentially by weight of about 2–40% of lime, about 2–40% of finely divided rapidly chilled blast furnace slag, approximately 20–80% of the total lime plus slag comprising said slag, and from about 50–90% by weight of pozzolan, wherein the ratio of percentage lime plus slag to percentage pozzolan falls substantially within the range of frim 1:1 to 1:9.

2. A non-plastic composition of matter consisting essentially by weight of about 10–50% of combined lime and finely divided rapidly chilled blast furnace slag, approximately 20–80% of the total lime plus slag comprising slag, and about 50–90% by weight of fly ash, and wherein said fly ash is of such fineness that at least approximately 70% by weight passes through a standard 200 mesh screen, at least about 70% by weight of said slag passing through a standard 325 mesh screen.

3. A non-plastic composition having high early compressive strength consisting essentially by weight of about 2–40% lime, about 2–40% finely divided water-quenched blast furnace slag substantially at least 70% of which passes through a standard 325 mesh screen, the quantity of said slag being from ¼ to four times by weight the quantity of said lime, and about 50–90% by weight of fly ash.

4. In a method of stabilizing an inert aggregate material by mixing about 2–40% by weight of a lime and about 50–90% by weight of a pozzolan therewith in the presence of moisture and compacting the resulting mixture, the improvement consisting of incorporating into said mixture prior to said compaction finely divided rapidly chilled blast furnace slag in a quantity of from about 20–80% by weight of the total of said lime plus said slag.

5. A non-plastic composition of matter consisting essentially by weight of about 1–9% of combined lime and finely divided blast furnace slag, approximatley 20–80% of the total of which comprises said slag, about 4–35% of pozzolan, and about 56–95% of inert aggregate, and wherein the ratio of percentage lime plus slag to percentage fly ash falls substantially within hte range of from 1:1 to 1:9.

6. A non-plastic composition of matter consisting essentially of 5–44% by weight of a mix consisting essentially by weight of about:
   (a) 10–50% combined lime plus finely divided rapidly chilled blast furnace slag, about 20–80% by weight of which comprises said slag, and
   (b) about 50–90% by weight of fly ash, at least about 70% by weight of which passes through a standard 200 mesh screen; and about 56–95% by weight of substantially chemically inert aggregate.

References Cited by the Examiner

UNITED STATES PATENTS

| 2,564,690 | 8/1951 | Havelin et al. | 106—120 |
| 2,752,261 | 6/1956 | Dournaud | 106—117 |
| 2,942,993 | 6/1960 | Handy et al. | 106—118 |
| 3,076,717 | 2/1963 | Minnick | 106—118 |
| 3,096,188 | 7/1963 | Mayol | 106—117 |

OTHER REFERENCES

Lea & Desch: The Chemistry of Cement and Concrete, Edward Arnold Ltd., London, 2nd Edition, 1956, pages 408–410.

TOBIAS E. LEVOW, *Primary Examiner.*